US007213500B2

(12) United States Patent

Chang

(10) Patent No.: US 7,213,500 B2
(45) Date of Patent: May 8, 2007

(54) PNEUMATIC TOOL

(75) Inventor: Jui-Sheng Chang, Wu-Jih Shiang (TW)

(73) Assignee: Mighty Seven International Co., Ltd, Taichung Hsien (TW)

(*) Notice: Subject to any disclaimer, the term of this patent is extended or adjusted under 35 U.S.C. 154(b) by 24 days.

(21) Appl. No.: 11/160,543

(22) Filed: Jun. 28, 2005

(65) Prior Publication Data

US 2006/0288860 A1 Dec. 28, 2006

(51) Int. Cl.
*B23B 45/04* (2006.01)
*F16K 11/06* (2006.01)

(52) U.S. Cl. .......................................... 91/418; 173/168

(58) Field of Classification Search .................. 91/418; 173/168, 169
See application file for complete search history.

(56) References Cited

U.S. PATENT DOCUMENTS 5,377,769 A * 1/1995 Hasuo et al. ............... 173/169
5,918,686 A * 7/1999 Izumisawa .................. 173/169
6,044,917 A * 4/2000 Brunhoelzl ................. 173/168
6,047,780 A * 4/2000 Lin ............................ 173/169
6,062,323 A * 5/2000 Pusateri et al. ............. 173/169
6,561,284 B2 * 5/2003 Taga .......................... 173/104
6,634,438 B1 * 10/2003 Pusateri et al. ............. 173/169
6,796,386 B2 * 9/2004 Izumisawa et al. ........ 173/93.5
6,883,619 B1 * 4/2005 Huang ........................ 173/169

* cited by examiner

*Primary Examiner*—Thomas E. Lazo
(74) *Attorney, Agent, or Firm*—Alan Kamrath; Kamrath & Associates PA

(57) ABSTRACT

A pneumatic tool includes a shell defining first, second, third and fourth communicating spaces, a channel communicated with the second space, an inlet communicated with the channel, and an outlet communicated with the second space. A cylinder in the first space defines first, second and third ports. Pressurized air drives a rotor in the cylinder in a direction while entering the cylinder through the first port and leaving the cylinder through the third port and in an opposite direction while entering the cylinder through the second port and leaving the cylinder through the third port. A cover connected to the shell defines an aperture communicated with the second space, a first channel communicated with the third space on one hand and the first port on the other hand, a second channel communicated with the fourth space on one hand and the second port on the other hand. A rotational switch extends into the second space through the aperture and defines two cutouts. Different portions of the channel open to selective one of the cutouts as the rotational switch is rotated so that the rotor is driven at different speeds.

20 Claims, 18 Drawing Sheets

3 – 3

4 - 4

5 - 5

PNEUMATIC TOOL

BACKGROUND OF INVENTION

1. Field of Invention

The present invention relates to a pneumatic tool and, more particularly, to an inexpensive pneumatic tool.

2. Related Prior Art

In Taiwanese Patent Publication No. 513992, there is disclosed an air-directing device of a pneumatic tool. This pneumatic tool includes a shell 20 defining spaces 21 and 26, a cylinder 23 put in the space 21, a rotor 22 put in the cylinder 23, a sleeve 32 put in the space 26, and a rotational switch 33 put in the sleeve 32 except an end by which the rotational switch 33 can be rotated. The air-directing device is made of the sleeve 32 and the rotational switch 33. The rotational switch 33 includes blocks 331–334. The sleeve 32 includes aperatures 321–325. As the rotational switch 33 is rotated in the sleeve 32, the blocks 331–334 are rotated relative to the apertures 321–325. Thus, the direction and rate of the rotation of the rotor 22 is changed. It is, however, troublesome and, hence, expensive to independently make the sleeve 32 and then to fit it in the space 26. Moreover, it is difficult and, hence, expensive to make the apertures 321–325 in the sleeve 32 and form the blocks 331–334 on the rotational switch 33.

In Taiwanese Patent Publication No. 367926, there is disclosed a controlling and regulating device for a pneumatic tool. This pneumatic tool includes a shell 40 defining spaces 41 and 45, a rotor (not shown) put in the space 41, and a rotational switch 70 put in the space 45 except an end by which the rotational switch 70 can be rotated. The rotational switch 70 includes two channels 711 and 712 and two slots 714 and 715. The channels 711 and 712 are communicated with and extended perpendicular to each other. As the rotational switch 70 is rotated, the channels 711 and 712 and the slots 714 and 715 are rotated. Thus, the direction and rate of the rotation of the rotor is changed. However,it is difficult and, hence, expensive to make the channel 711 and 712 that are communicated with and extended perpendicular to each other. Furthermore, it entails a cost to make the slots 714 and 715.

The present invention is therefore intended to obviate or at least alleviate the problems encountered in the prior art.

SUMMARY OF INVENTION

According to the present invention, a pneumatic tool includes a shell defining a first space, a second space communicated with the first space, a third space communicated with the second space, a fourth space communicated with the second space, a channel communicated with the second space, an inlet communicated with the channel, and an outlet communicated with the second space. A cylinder is put in the first space and defines first, second and third ports. Pressurized air drives a rotor in the cylinder in a direction while entering the cylinder through the first port and leaving the cylinder through the third port. Pressurized air drives the rotor in an opposite direction while entering the cylinder through the second port and leaving the cylinder through the third port. A cover is connected to the shell and defines an aperture communicated with the second space, a first channel communicated with the third space on one hand and the first port on the other hand, a second channel communicated with the fourth space on one hand and the second port on the other hand. A rotational switch extends into the second space the aperture and defines two cutouts. Different portions of the channel open to selective one of the cutouts as the axle is rotated in the second space so that the rotor is driven at different speeds.

The primary advantage of the pneumatic tool according to the present invention is a low cost of the rotational switch, since the cutouts can easily be made in the axle.

Other advantages and novel features of the invention will become more apparent from the following detailed description in conjunction with the drawings.

BRIEF DESCRIPTION OF DRAWINGS

The present invention will be described through detailed description of the preferred embodiment referring to the drawings.

DETAILED DESCRIPTION OF PREFERRED EMBODIMENT

Figure 1:
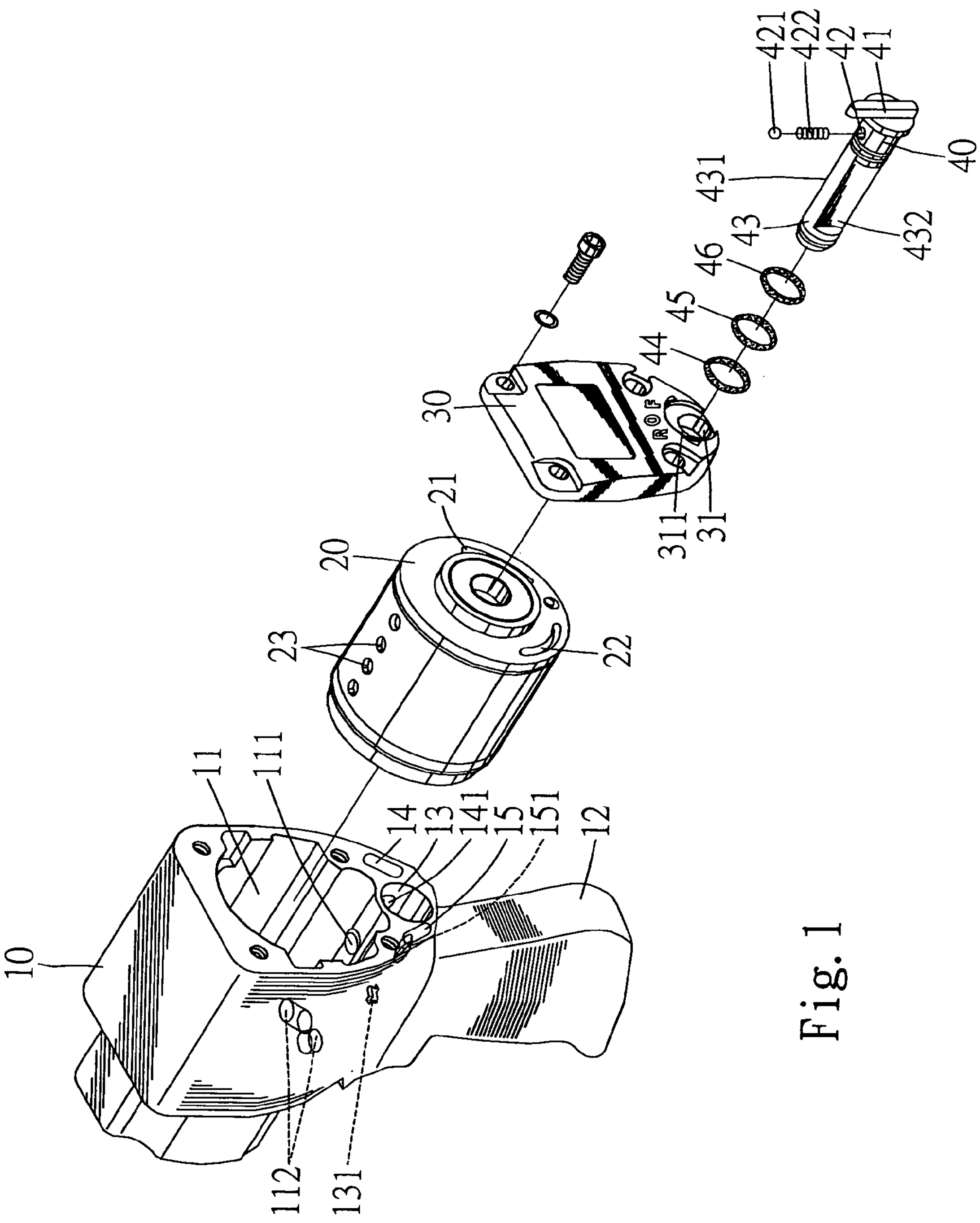
FIG. 1 is an exploded view of a pneumatic tool according to the preferred embodiment of the present invention.

Referring to FIG. 1, there is shown a pneumatic tool according to the preferred embodiment of the present invention. The pneumatic tool includes a shell 10, a handle 12 extended from the shell 10, a cylinder 20, a cover 30, and a rotational switch 40.

Figure 2:
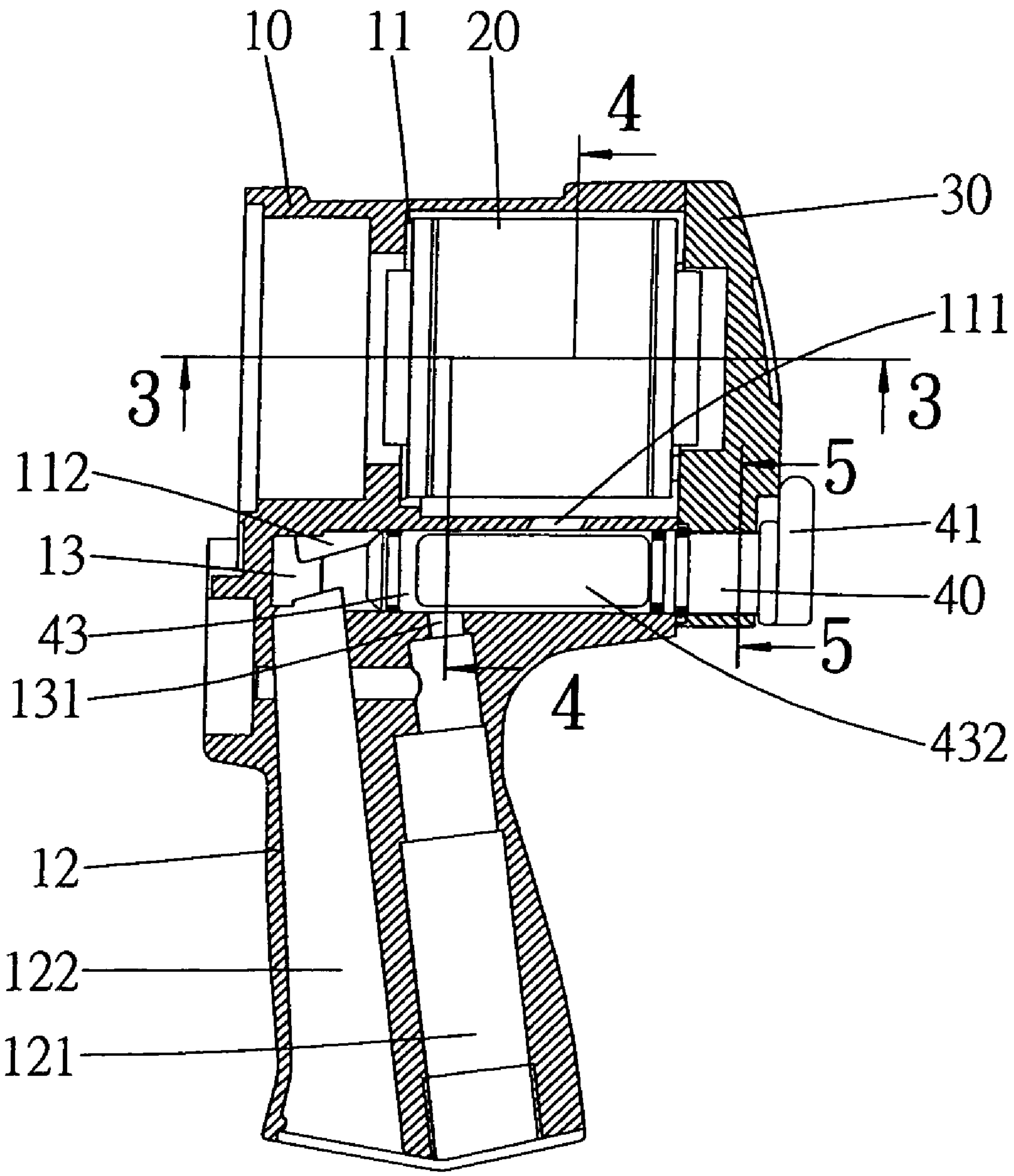
FIG. 2 is a cross-sectional view of the pneumatic tool shown in FIG. 1.
Figure 3:
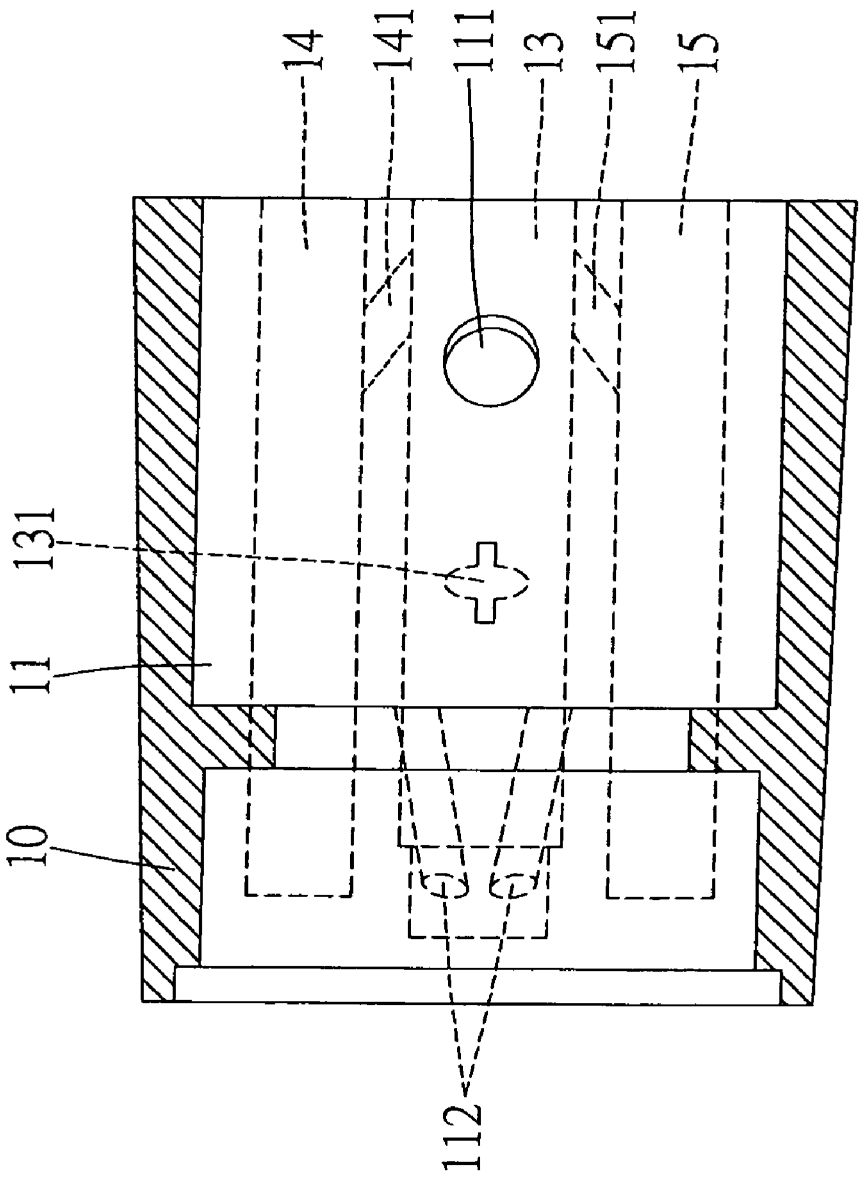
FIG. 3 is a cross-sectional view taken along a line 3—3 in FIG. 2.

Referring to FIGS. 2 and 3, the shell 10 defines spaces 11, 13, 14, and 15. The space 11 is communicated with the space 13 through a channel 111 near an end and through two channels 112 near an opposite end. The space 13 is communicated with the space 14 through a channel 141. The space 13 is communicated with the space 15 through a channel 151.

The handle 12 defines an inlet 121 and an outlet 122. The inlet 121 is communicated with the space 13 through a channel 131 with a cruciform profile. However, the channel 131 may include another profile such as a rhombus. The outlet 122 is communicated with the space 13 through the channels 112.

The cylinder 20 is put in the space 11. The cylinder 20 defines two ports 21 and 22 in an end thereof and a plurality of ports 23 in a periphery thereof. Although not shown, a rotor is put in the cylinder 20. While entering the cylinder 20 through the port 21 and leaving the cylinder 20 through the ports 23, pressurized air drives the rotor in a forward direction. While entering the cylinder 20 through the port 22 and leaving the cylinder 20 through the ports 23, pressurized air drives the rotor in a reversed direction.

Figure 5:
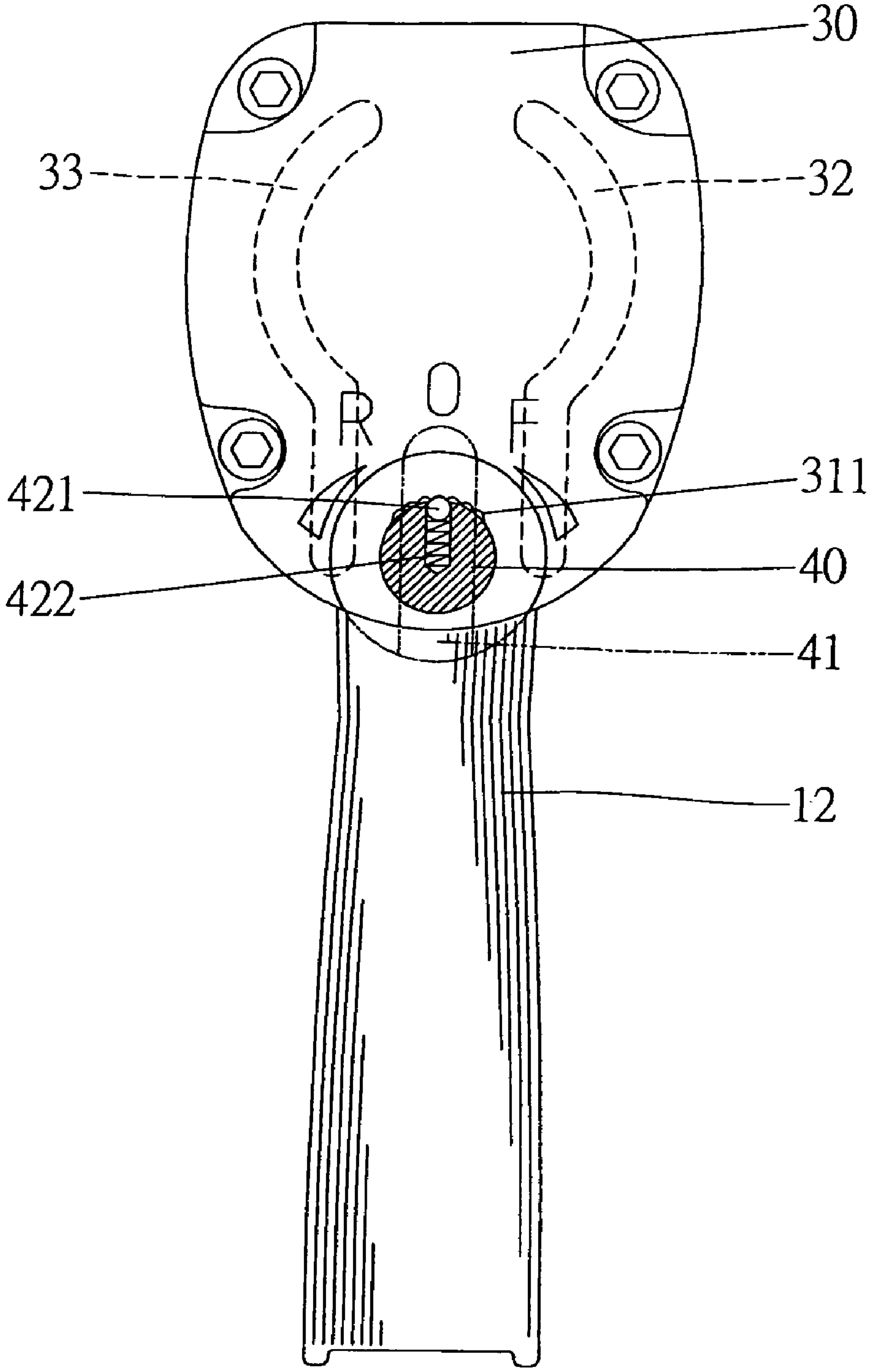
FIG. 5 is a cross-sectional view taken along a line 5—5 in FIG. 2.

Referring to FIG. 5, the cover 30 is connected to the shell 10. The cover 30 defines an aperture 31, a plurality of recesses 311 in the wall of the aperture 31, and two channels 32 and 33 in an internal side thereof. The aperture 31 is communicated with the space 13. The cover 30 is put against the end of the cylinder 20 so that the channels 32 and 33 become two separate channels. The channel 32 includes an end communicated with the space 14 and another end communicated with the port 21. The channel 33 includes an end communicated with the space 15 and another end communicated with the port 22. Marks "F", "O" and "R" are made on an external side of the cover 30 in order to indicate the status of the pneumatic tool.

The rotational switch 40 includes a knob 41 and an axle 43 extended from the knob 41. The axle 43 is put in the space 13 through the aperture 31. The axle 43 defines two separate cutouts 431 and 432. A positioning device is connected to the axle 43. The positioning device includes a detent 421 and a spring 422. The detent 421 is biased by the spring 422 that is put in a recess 42 defined in the axle 43 near the knob 41. The knob 41 facilitates the rotation of the axle 43. The detent 421 can be put partially in one of the recesses 311 in order to keep the axle 43 in one of several positions in the space 13. Two seals 44 are 45 are put around the axle 43 for sealing. The channel 111 is separated from the channels 112 by the seal 44. A ring 46 is put around the axle 43 and engaged with the cover 30 in order to keep the axle 43 in the space 13.

Figure 4:
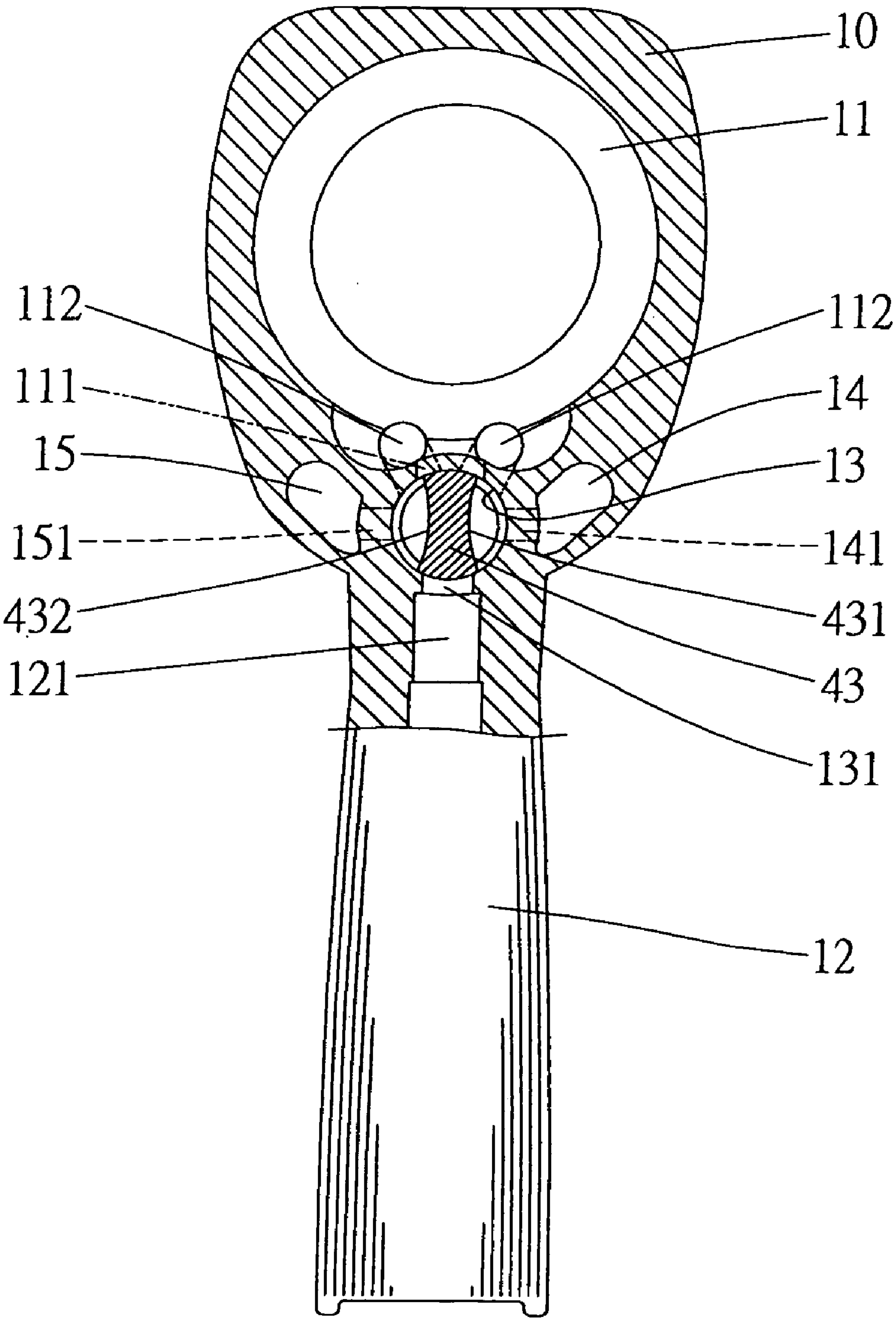
FIG. 4 is a cross-sectional view taken along a line 4—4 in FIG. 2.
Figure 6:
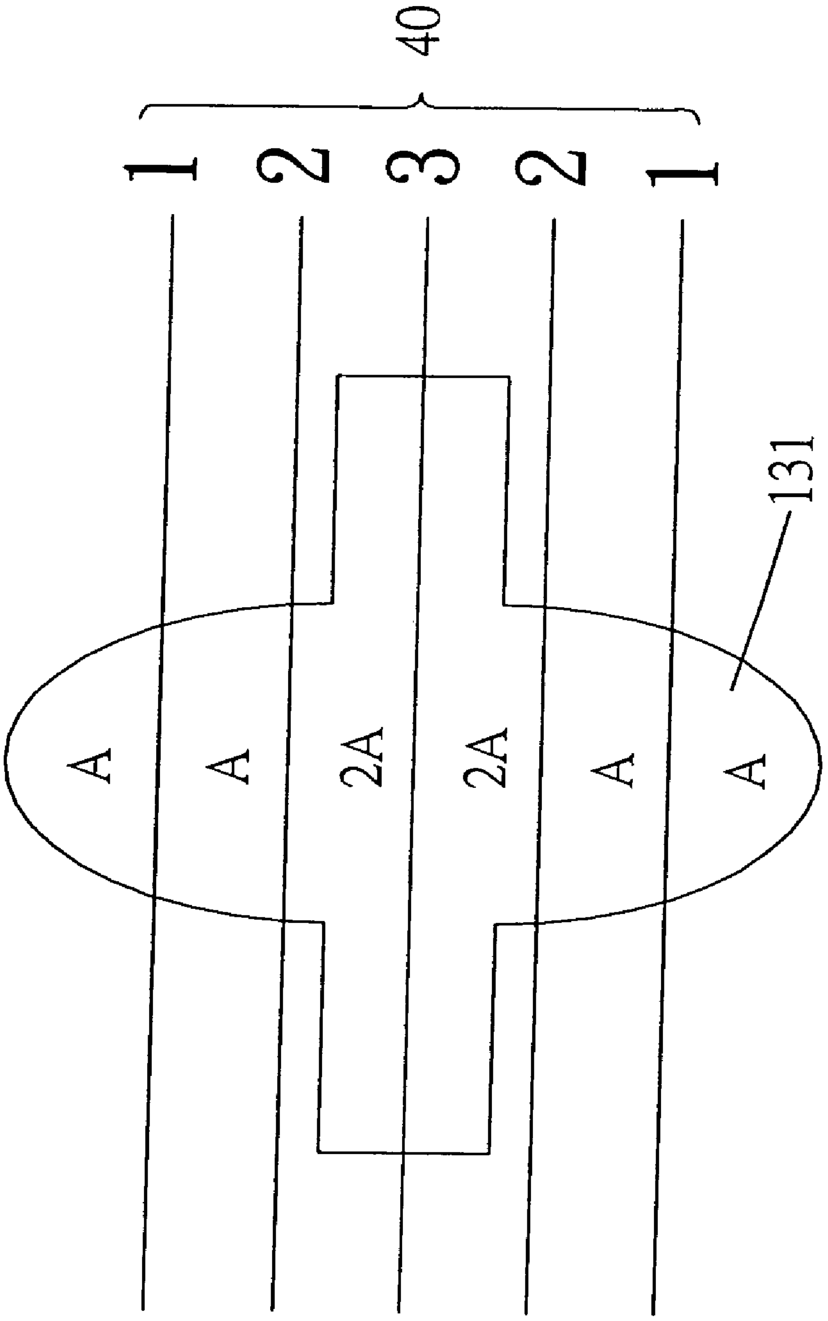
FIG. 6 is an enlarged partial view of the pneumatic shown in FIG. 3 in order to show open positions of a channel related to operative rates.

Referring to FIGS. 3, 4 and 6, as the axle 43 is rotated in the space 13, different portions of the channel 131 open to the cutout 431 or 432. As a small portion (A) of the channel 131 opens to the cutout 431 or 432, the rotor is rotated at a low speed. As a medium portion (A plus A) of the channel 131 opens the cutout 431 or 432, the rotor is rotated at a medium speed. Because the medium portion is twice as large as the small portion, the medium speed is twice as fast as the low speed. As a large portion (A plus A plus 2A) of the channel 131 opens to the cutout 431 or 432, the rotor is rotated at a high speed. Because the large portion is twice as large as the medium portion, the high speed is twice as fast as the medium speed.

Figure 7:
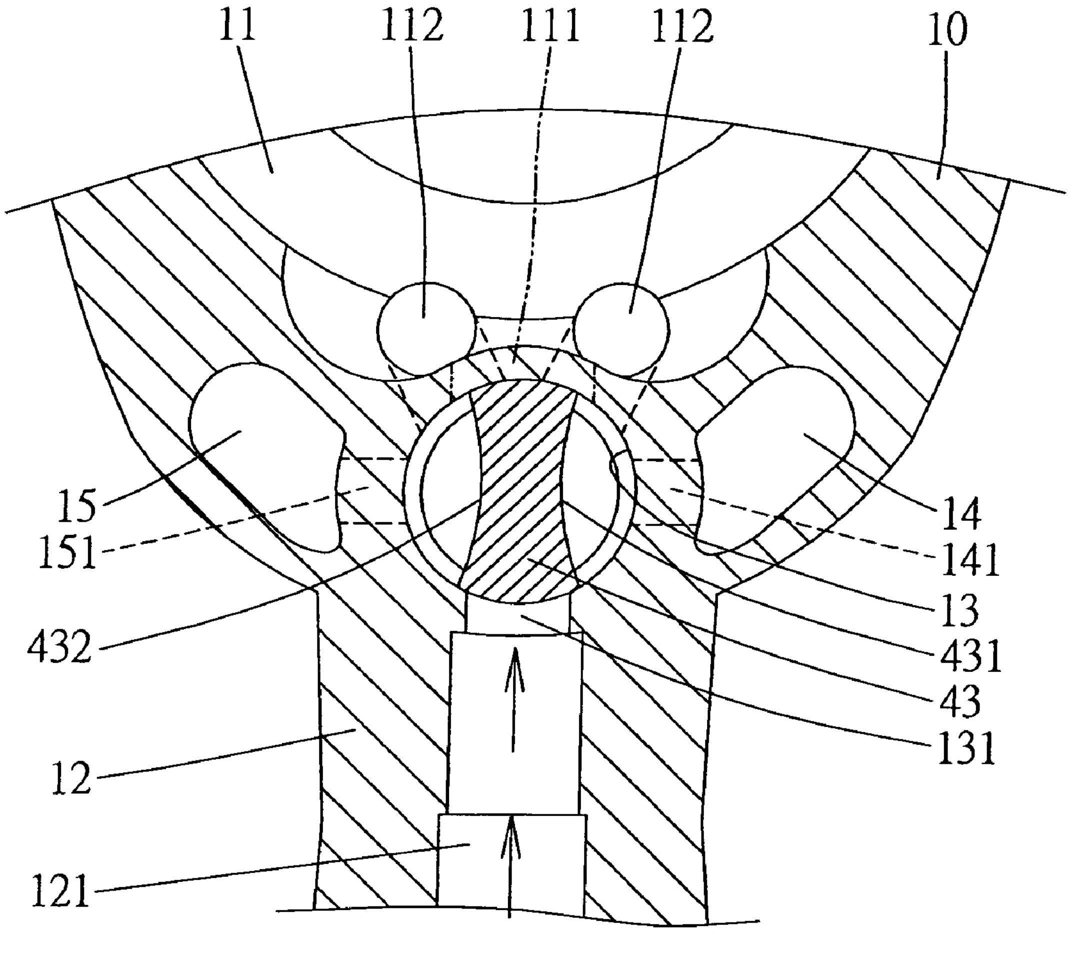
FIG. 7 is an enlarged partial view of the pneumatic tool of FIG. 4 in an idle position.
Figure 8:
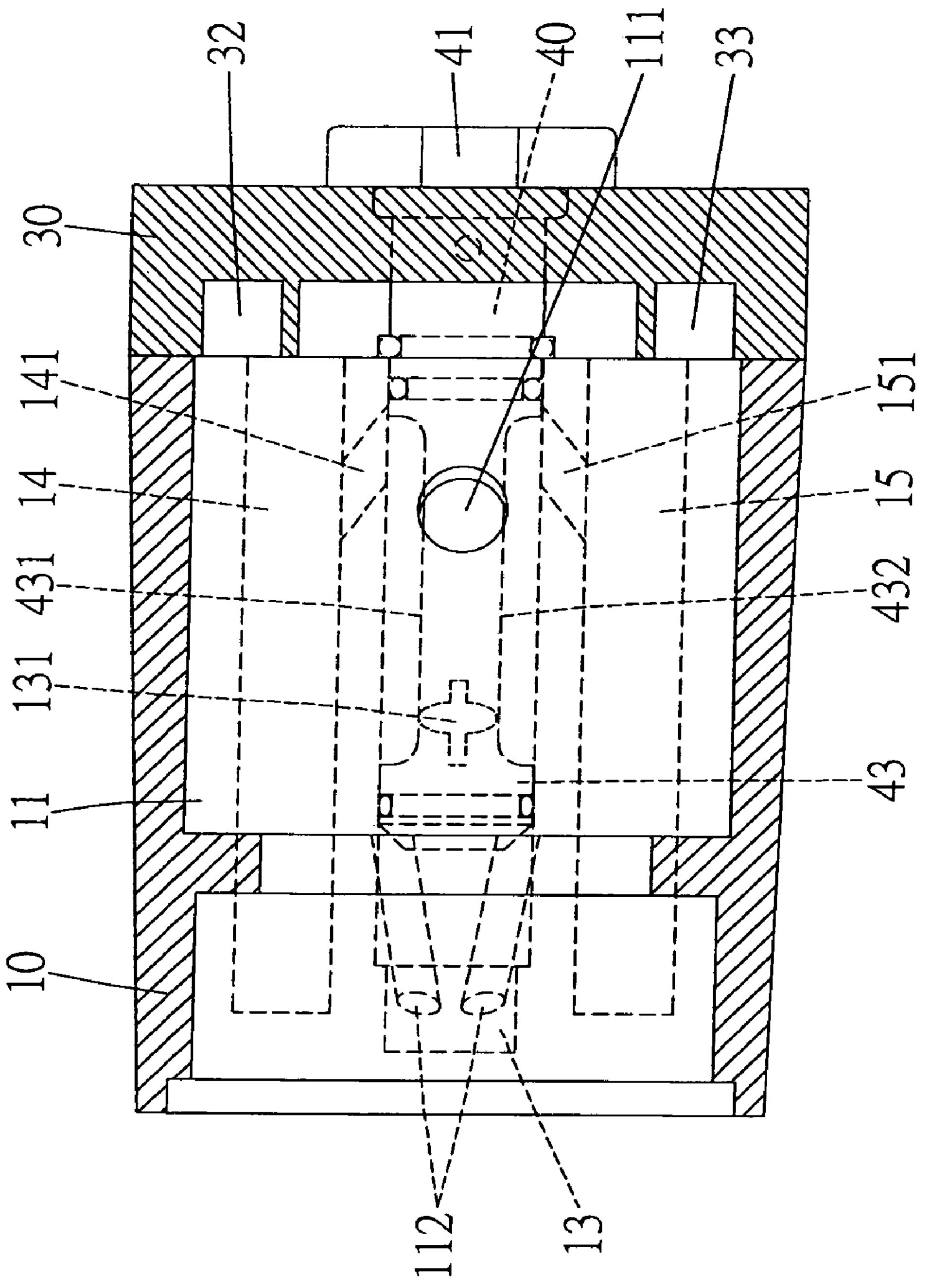
FIG. 8 is a cross-sectional view of the pneumatic tool shown in FIG. 7.
Figure 9:
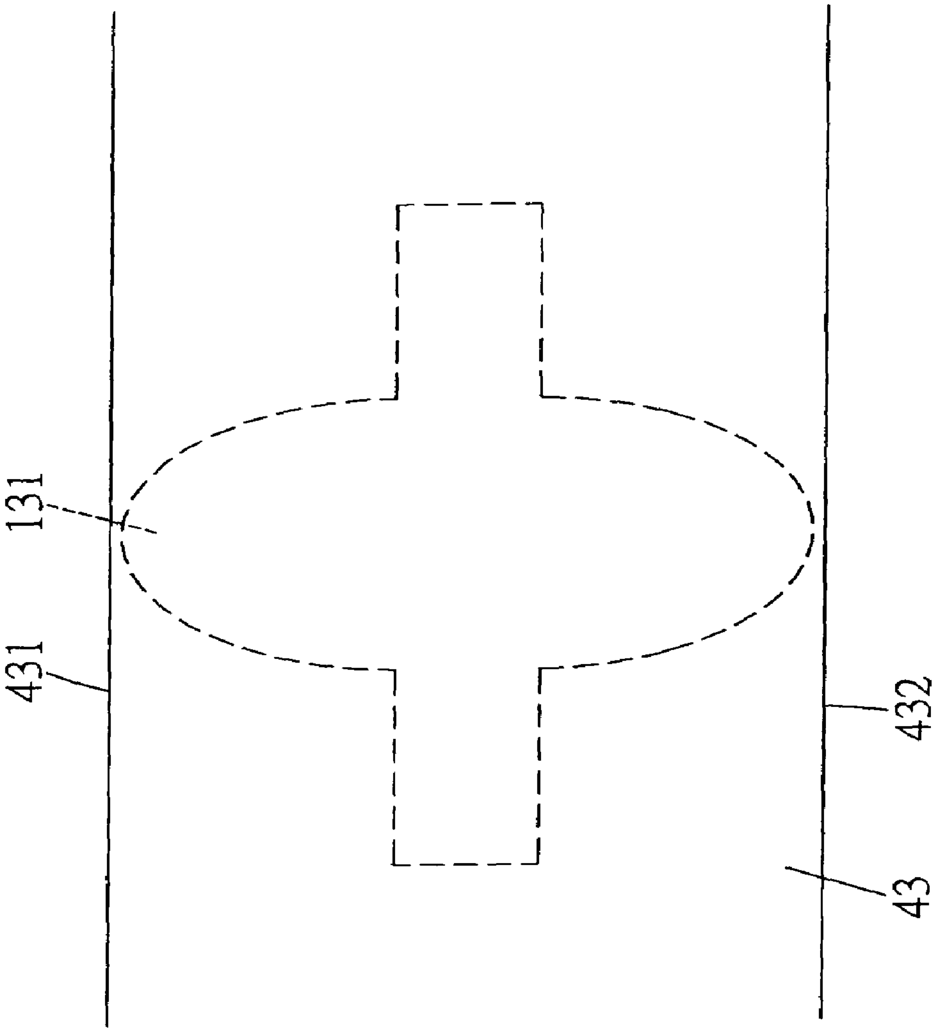
FIG. 9 is an enlarged partial view of the pneumatic tool of FIG. 8.

Referring to FIGS. 7 through 9, the pneumatic tool is in an idle position. The channel 131 is blocked by the axle 43.

Figure 10:
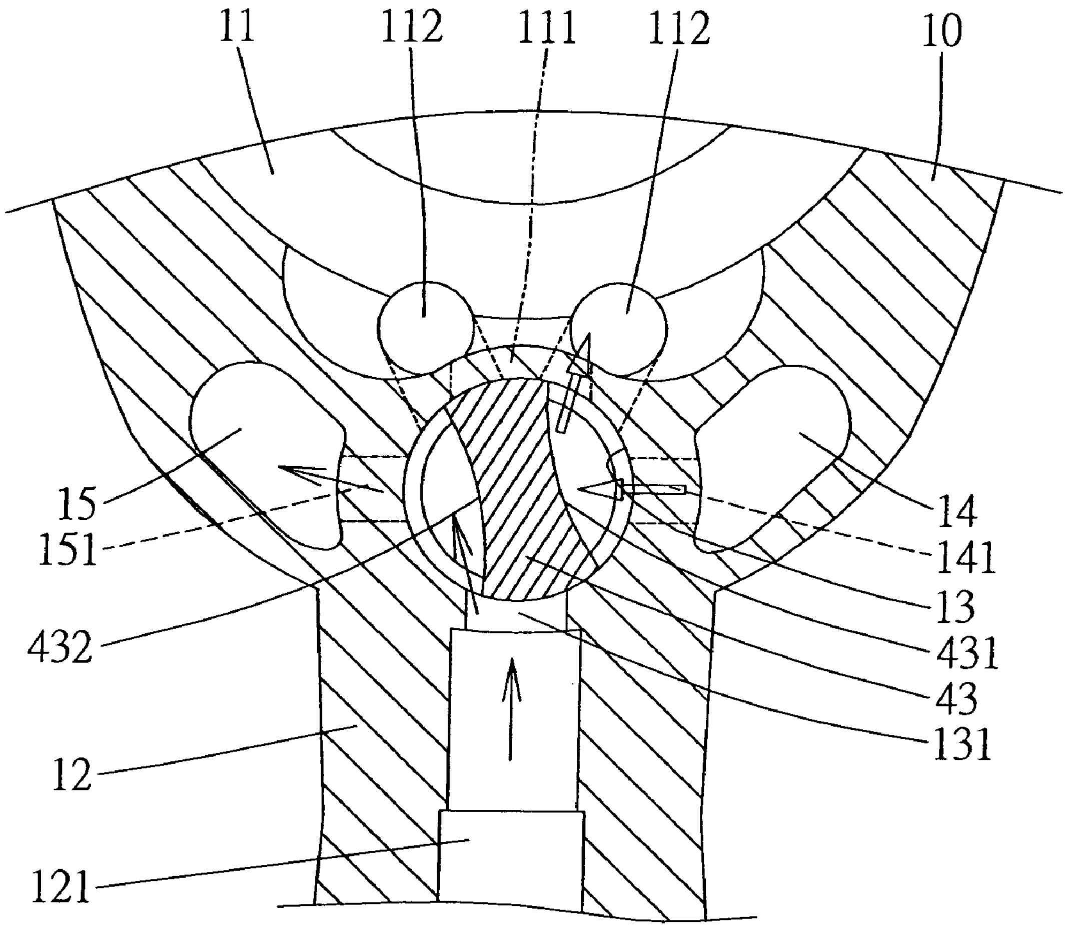
FIG. 10 is similar to FIG. 7 but shows the pneumatic tool operated in a reversed direction at a low speed.
Figure 11:
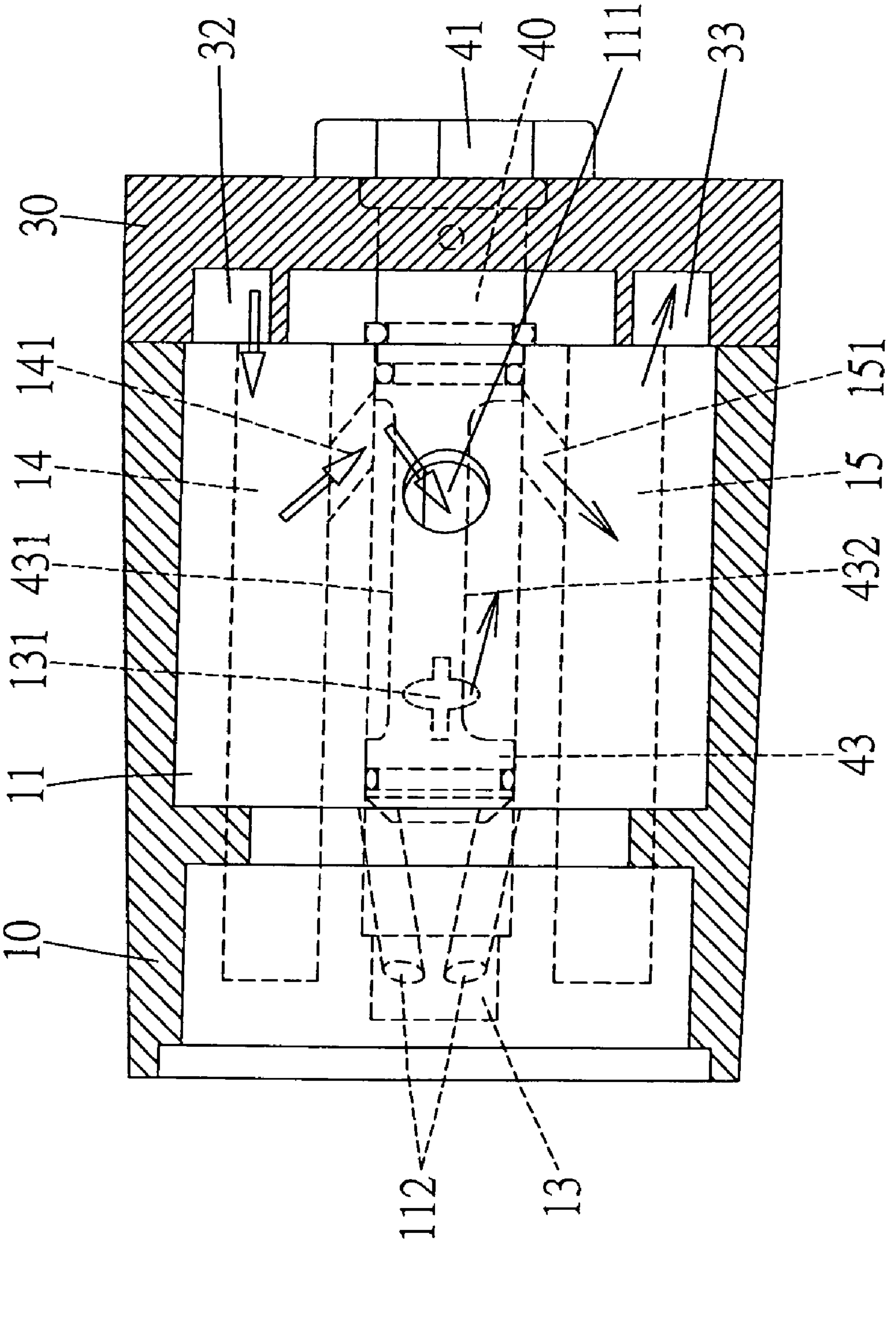
FIG. 11 is a cross-sectional view of the pneumatic tool of FIG. 10.
Figure 12:
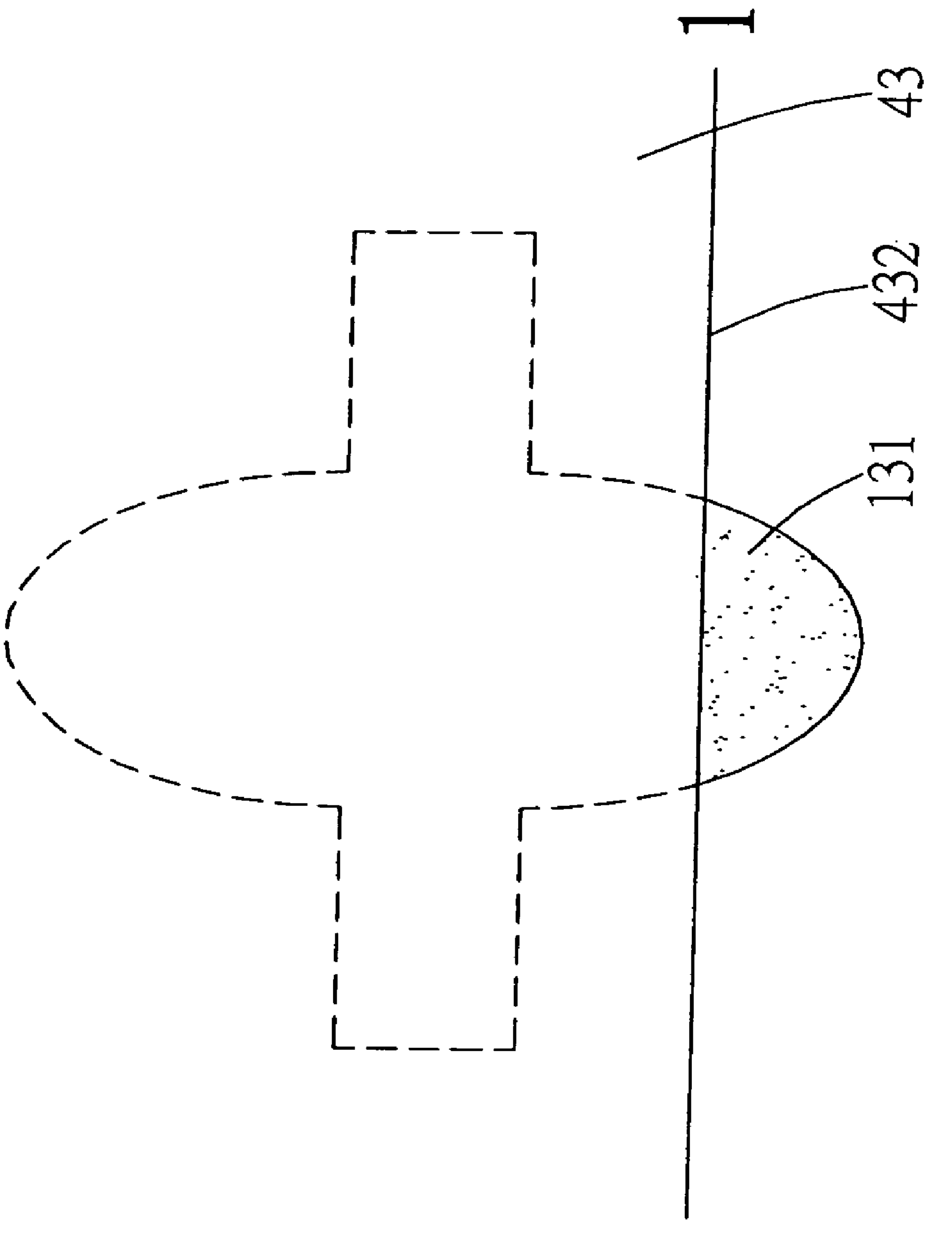
FIG. 12 is an enlarged partial view of the pneumatic tool of FIG. 11.

Referring to FIGS. 10 through 12, the rotor is rotated in the reversed direction at the low speed. As indicated with thin arrowheads, pressurized air goes to the port 22 from the inlet 121 through the channel 131, the cutout 432, the channel 151, the space 15 and the channel 33. The pressurized air enters the cylinder 20 through the port 22 in order to rotate the rotor in the reversed direction. As a small portion of the channel 131 opens to the inlet 121, the rotor is rotated at the low speed.

A portion of the pressurized air leaves the cylinder 20 through the ports 23, and goes to the outlet 122 through the space 11, the channels 112 and the space 13. As indicated with thick arrowheads, the other portion of the pressurized air leaves the cylinder 20 through the port 21, and goes to the outlet 122 through the channel 32, the space 14, the channel 141, the cutout 431, the channel 111, the space 11 and one of the channels 112.

Figure 13:
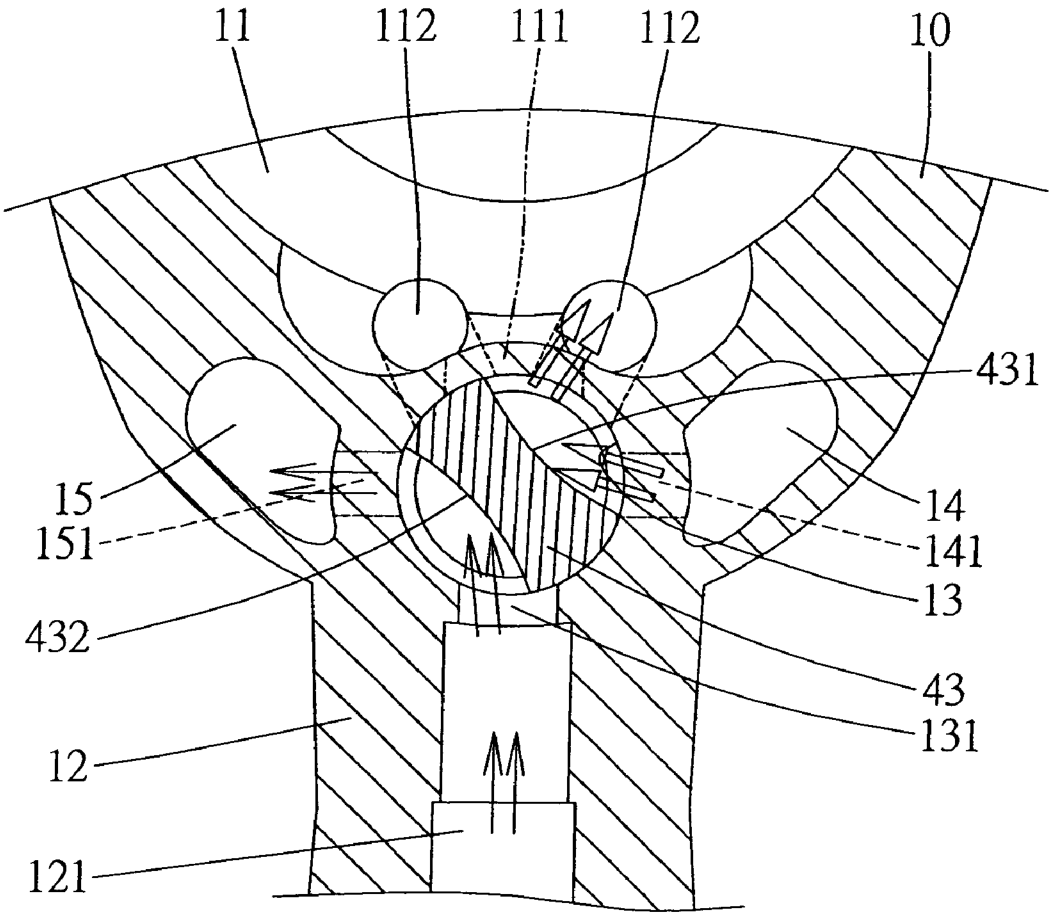
FIG. 13 is similar to FIG. 10 but shows the pneumatic tool operated at a high speed.
Figure 14:
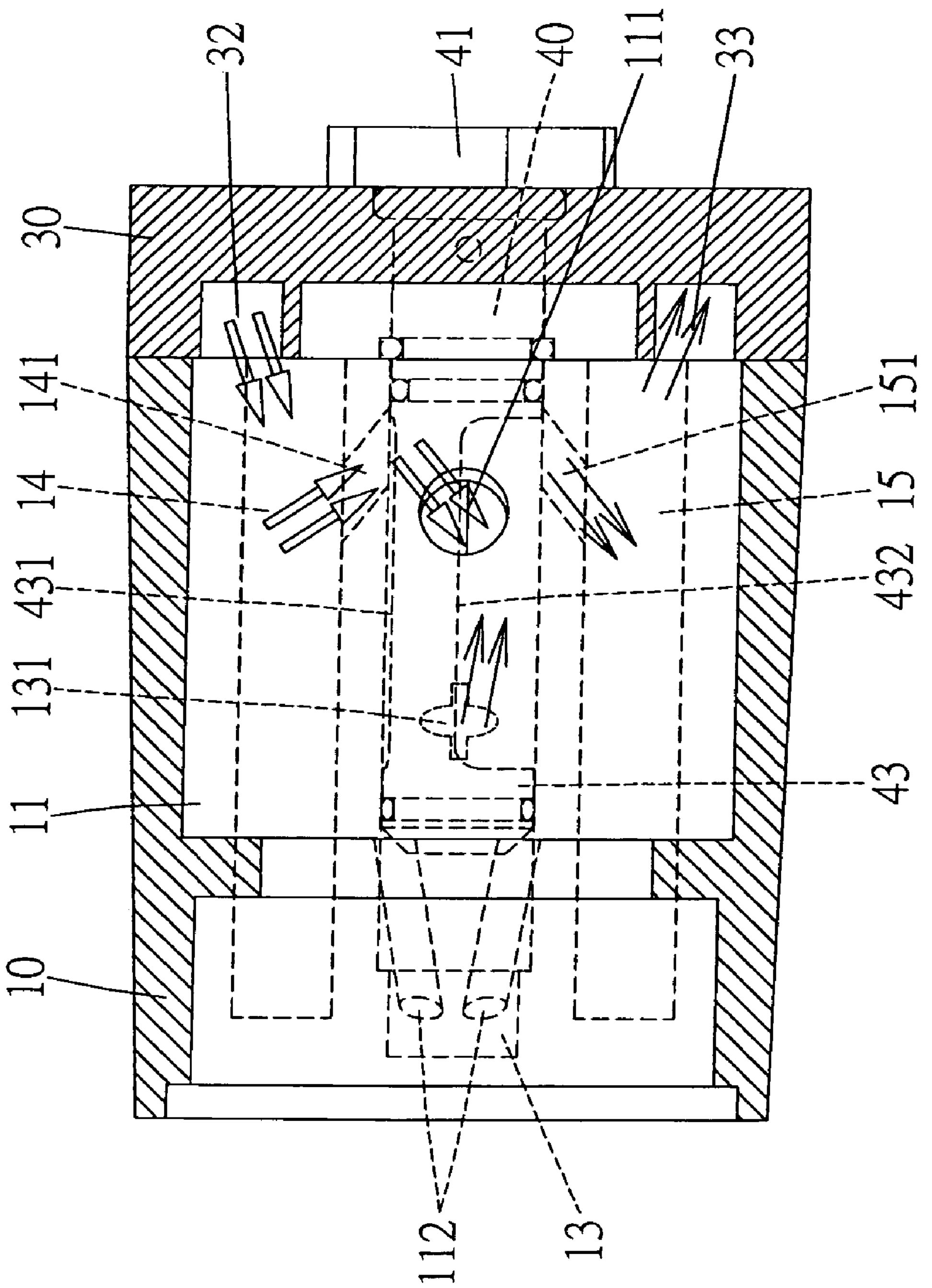
FIG. 14 is a cross-sectional view of the pneumatic tool of FIG. 13.
Figure 15:
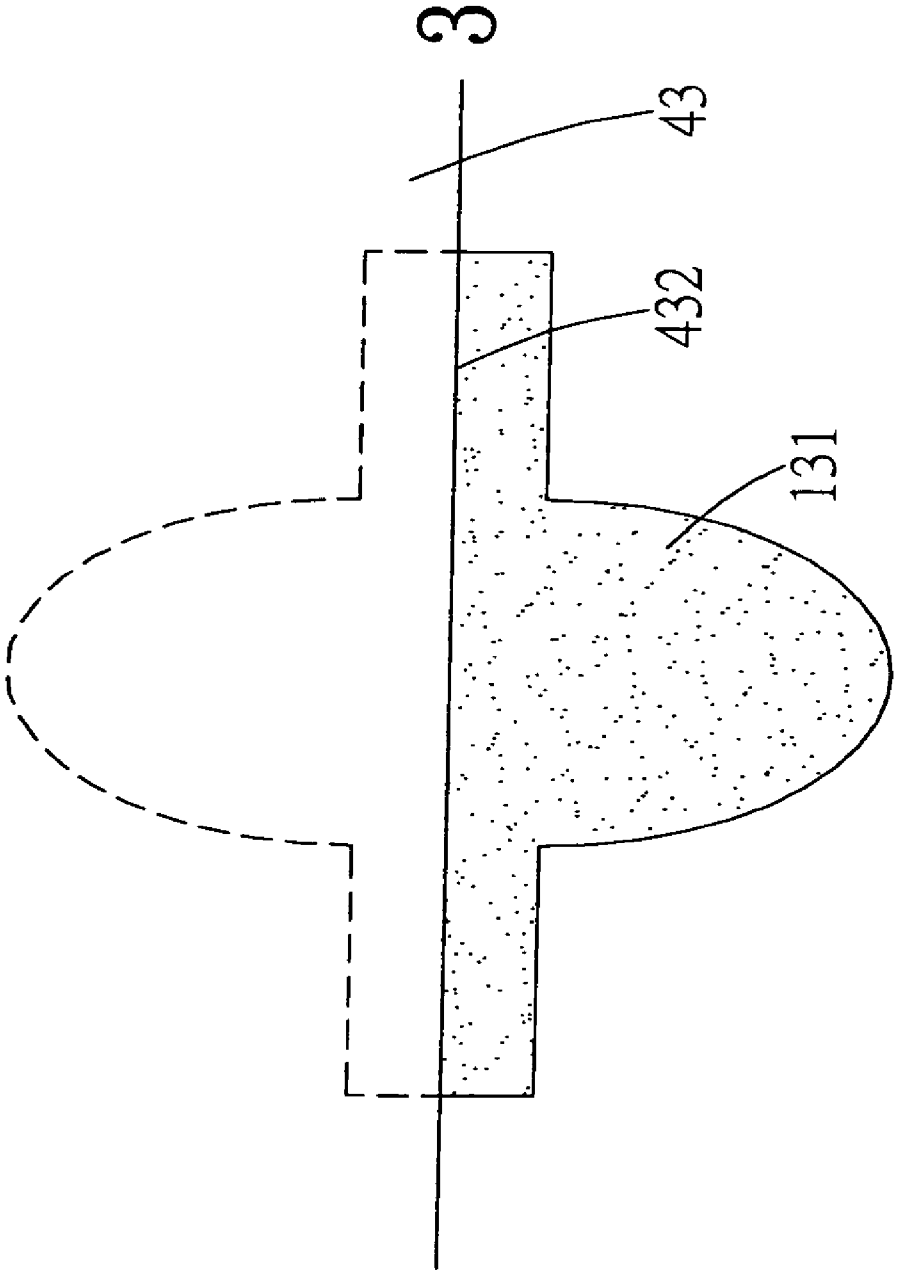
FIG. 15 is an enlarged partial view of the pneumatic tool of FIG. 14.

Referring to FIGS. 13 through 15, the rotor is rotated in the reversed direction at a high speed. Pressurized air goes to the port 22 from the inlet 121 through the channel 131, the cutout 432, the channel 151, the space 15, and the channel 33. The pressurized air enters the cylinder 20 through the port 22 in order to rotate the rotor in the reversed direction. As a large portion of the channel 131 opens the inlet 121, the rotor is rotated at the high speed.

Figure 16:
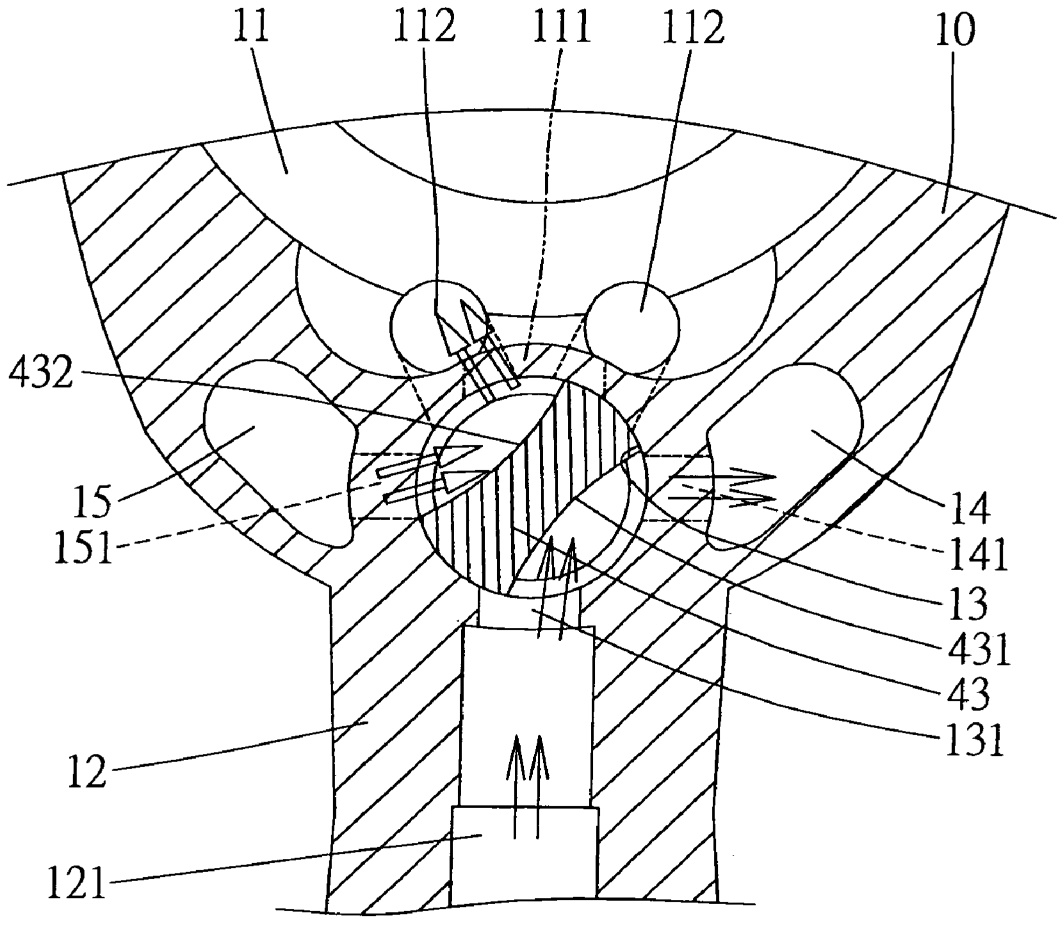
FIG. 16 is similar to FIG. 13 but shows the pneumatic tool operated in a forward direction.
Figure 17:
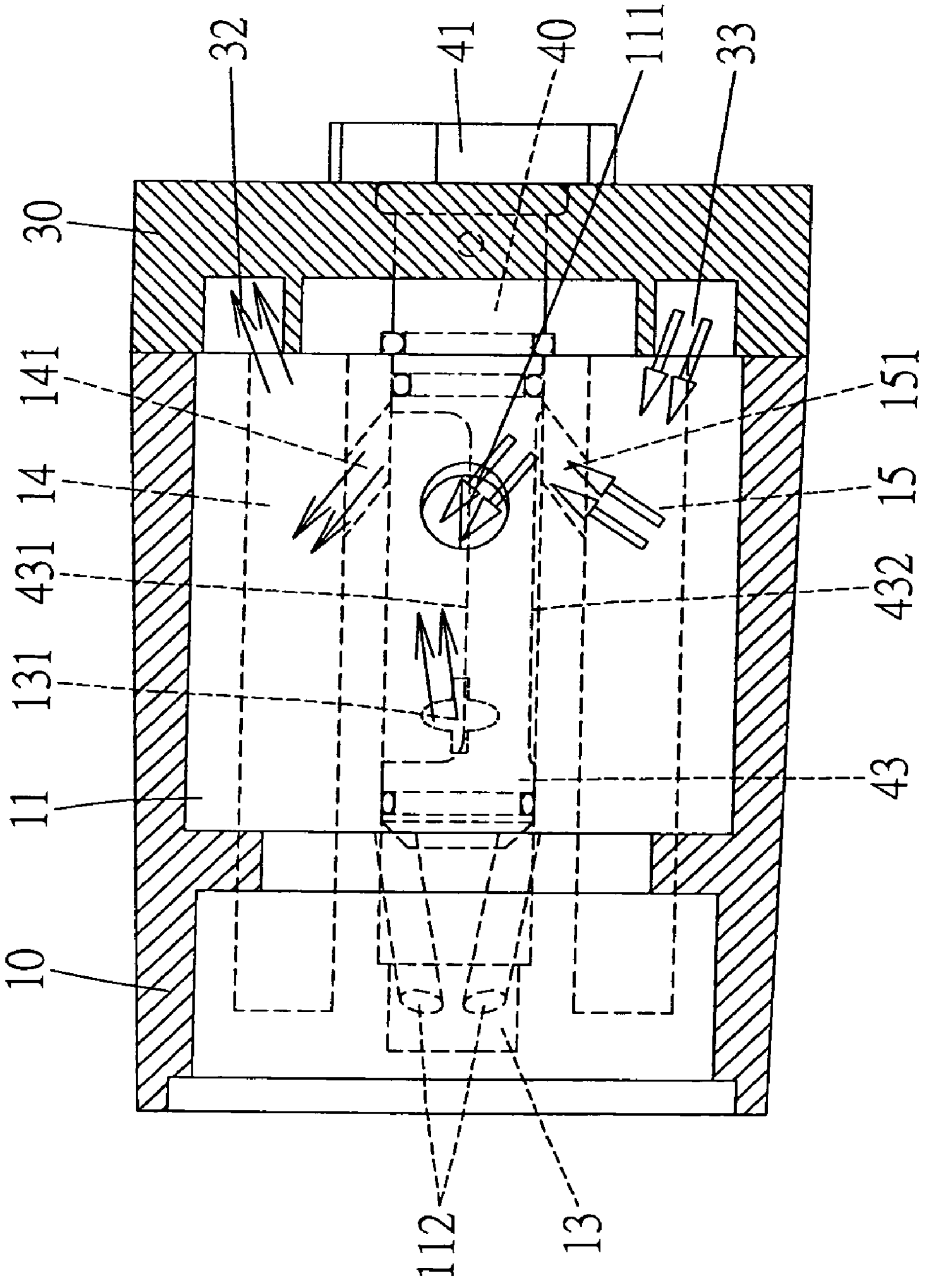
FIG. 17 is a cross-sectional view of the pneumatic tool of FIG. 16.
Figure 18:
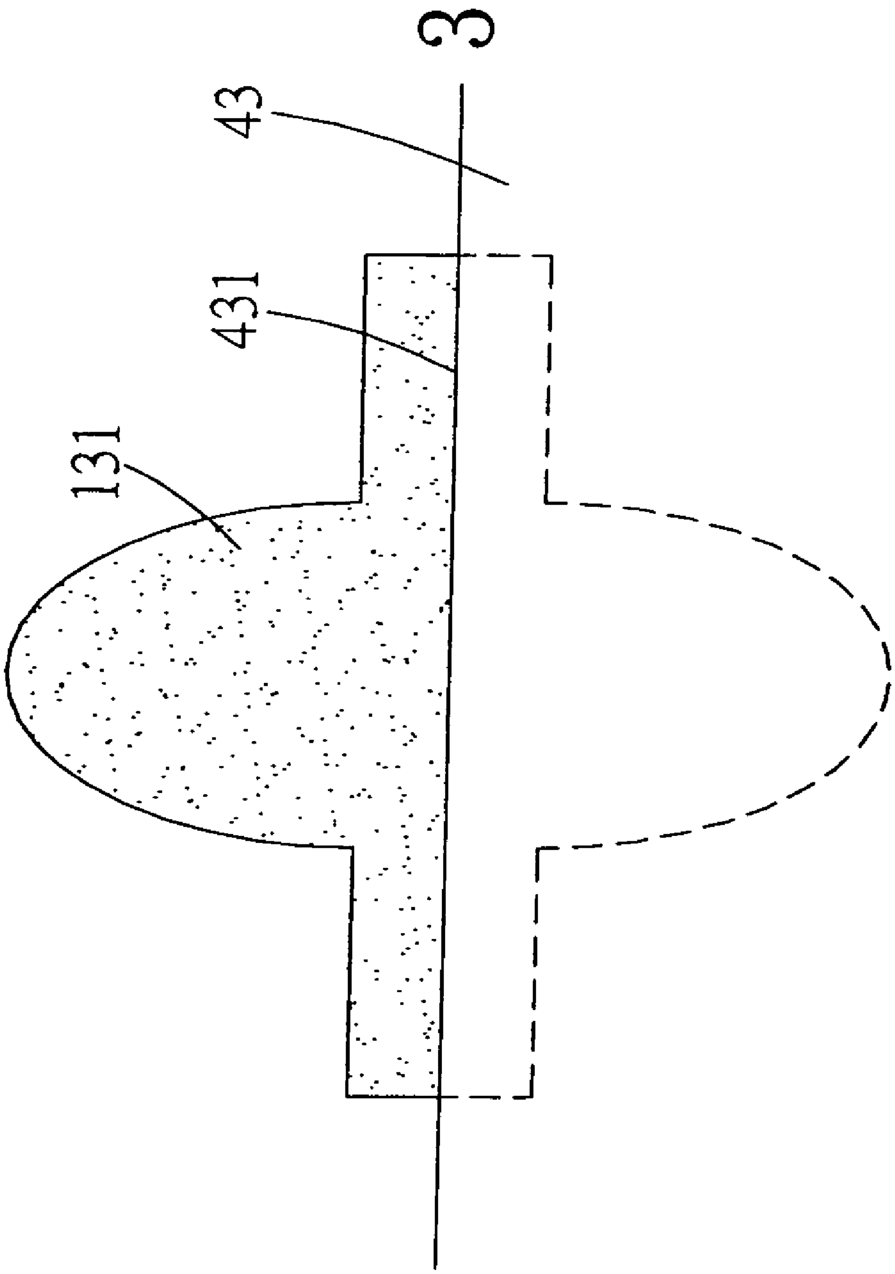
FIG. 18 is an enlarged partial view of the pneumatic tool of FIG. 17.

Referring to FIGS. 16 through 18, the rotor is rotated in the forward direction at a high speed. Pressurized air goes to the port 21 from the inlet 121 through the channel 131, the cutout 431, the channel 141, the space 14, and the channel 32. The pressurized air enters the cylinder 20 through the port 21 in order to rotate the rotor in the forward direction. As a large portion of the channel 131 opens to the inlet 121, the rotor is rotated at the high speed.

A portion of the pressurized air leaves the cylinder 20 through the ports 23, and goes to the outlet 122 through the space 11, the channels 112 and the space 13. As indicated with thick arrowheads, the other portion of the pressurized air leaves the cylinder 20 through the port 22, and goes to the outlet 122 through the channel 33, the space 15, the channel 151, the cutout 432, the channel 111, the space 11 and one of the channels 112.

Compared with the conventional pneumatic tools discussed in the Related Prior Art, the pneumatic tool of the present invention is advantageous in several aspects. Firstly, the cutouts 431 and 432 can easily be made in the axle 43 so that the cost of the rotational switch 40 is low. Secondly, since the cutouts 431 and 432 form part of a discharge route, the rotational switch 40 is saved from any auxiliary venting device so that the cost of the rotational switch is low. Thirdly, the channel 131 and the cutouts 431 and 432 render the differences between the speeds large so that the performance of the pneumatic tool is good.

The present invention has been described through the detailed description of the preferred embodiment. Those skilled in the art can derive variations from the preferred embodiment without departing from the scope of the present invention. The preferred embodiment shall not limit the scope of the present invention defined in the claims.

What is claimed is:

1. A pneumatic tool comprising:

a shell defininig a first space, a second space communicated with the first space, a third space communicated with the second space, a fourth space communicated with the second space, a channel communicated with the second space, an inlet communicated with the channel, and an outlet communicated with the second space;

a cylinder put in the first space, the cylinder defining first, second and third ports, wherein pressurized air drives a rotor in the cylinder in a direction while entering the cylinder through the first port and leavinig the cylinder through the third port, wherein pressurized air drives the rotor in an opposite direction while entering the cylinder through the second port and leaving the cylinder through the third port;

a cover connected to the shell, the cover defining an aperture communicated with the second space, a first channel communicated with the third space on one hand and the first port on the other hand, a second channel communicated with the fourth space on one hand and the second port on the other hand, and a rotational switch extendirnr into the second space through the aperture and comprising two cutouts, wherein different portions of the channel open to selective one of the cutouts as the rotational switch is rotated in the second space so that the rotor is driven at different speeds, wherein the channel comprises a cruciform profile.

2. The pneumatic tool according to claim 1 wherein the cruciform profile of the channel comprises square front and rear ends and two arched wings.

3. The pneumatic tool according to claim 1 wherein the third port comprises a series of apertures.

4. The pneumatic tool according to claim 1 wherein the rotational switch comprises an axle extending into the second space through the aperture.

5. The pneumatic tool according to claim 4 wherein the cutouts are on two opposite sides of the axle.

6. The pneumatic tool according to claim 4 wherein the rotational switch comprises a knob formed an end of the axle exposed from the shell and the cover in order to facilitate the rotation of the rotational switch.

7. The pneumatic tool according to claim 1 wherein the cover defines a plurality of recesses in the wall of the aperture corresponding to the rotational speeds of the rotor, wherein the rotational switch comprises a positioning device for entering selective one of the recesses.

8. The pneumatic tool according to claim 7 wherein the positioning device comprises a detent for entering the recesses and a spring compressed between the detent and the rotational switch.

9. The pneumatic tool according to claim 8 wherein the rotational switch defines a recess for receiving the spring and the detent.

10. The pneumatic tool according to claim 1 comprising a ring between the cover and the rotational switch in order to keep the rotational switch in position.

11. A pneumatic tool comprising:

a shell defining a first space, a second space communicated with the first space, a third space communicated with the second space, a fourth space communicated with the second space, a channel communicated with the second space, an inlet communicated with the channel, and an outlet communicated with the second space;

a cylinder put in the first space, the cylinder defining first, second and third ports, wherein pressurized air drives a rotor in the cylinder in a direction while entering the cylinder through the first port and leaving the cylinder through the third port, wherein pressurized air drives the rotor in an opposite direction while entering the cylinder through the second port and leaving the cylinder through the third port;

a cover connected to the shell, the cover defininig an aperture communicated with the second space, a first channel communicated with the third space on one hand and the first port on the other hand, a second channel communicated with the fourth space on one hand and the second port on the other hand, and a rotational switch extending into the second space through the aperture and comprising two cutouts, wherein different portions of the channel open to selective one of the cutouts as the rotational switch is rotated in the second space so that the rotor is driven at different speeds, wherein the channel comprises a rhombus profile.

12. The pneumatic tool according to claim 11 wherein the third port comprises a series of apertures.

13. The pneumatic tool according to claim 11 wherein the rotational switch comprises an axle extending into the second space through the aperture.

14. The pneumatic tool according to claim 13 wherein the cutouts are on two opposite sides of the axle.

15. The pneumatic tool according to claim 13 wherein the rotational switch comprises a knob formed an end of the axle exposed from the shell and the cover in order to facilitate the rotation of the rotational switch.

16. The pneumatic tool according to claim 11 wherein the cover defines a plurality of recesses in the wall of the aperture corresponding to the rotational speeds of the rotor, wherein the rotational switch comprises a positioning device for entering selective one of the recesses.

17. The pneumatic tool according to claim 16 wherein the positioning device comprises a detent for entering the recesses and a spring compressed between the detent and the rotational switch.

18. The pneumatic tool according to claim 17 wherein the rotational switch defines a recess for receiving the spring and the detent.

19. The pneumatic tool according to claim 11 comprising a ring between the cover and the rotational switch in order to keep the rotational switch in position.

20. The pneumatic tool according to claim 11 comprising two seals between the wall of the second space and the rotational switch besides the cutouts.

* * * * *